United States Patent
Shukla et al.

(10) Patent No.: US 7,782,604 B1
(45) Date of Patent: Aug. 24, 2010

(54) INERTIAL VIBRATION ISOLATION FOR HDD PRODUCTION

(75) Inventors: Dinesh Shukla, Rutland, MA (US); Charles Ray, Shrewsbury, MA (US); Timothy D. Jolly, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 817 days.

(21) Appl. No.: 11/542,685

(22) Filed: Oct. 2, 2006

Related U.S. Application Data

(60) Provisional application No. 60/722,851, filed on Sep. 30, 2005.

(51) Int. Cl.
*H05K 7/12* (2006.01)
(52) U.S. Cl. .............. 361/679.34; 361/679.33; 312/223.1
(58) Field of Classification Search ............ 361/679.34, 361/679.33, 679.35, 679.36; 312/223.1
See application file for complete search history.

(56) References Cited

U.S. PATENT DOCUMENTS

| | | | | |
|---|---|---|---|---|
| 5,400,196 A * | 3/1995 | Moser et al. | ............. | 360/97.02 |
| 6,822,858 B2 * | 11/2004 | Allgeyer et al. | ........ | 361/679.34 |
| 7,092,251 B1 * | 8/2006 | Henry | .................... | 361/679.36 |
| 7,324,337 B2 * | 1/2008 | Padin | ......................... | 361/695 |
| 2004/0112132 A1 * | 6/2004 | Fioravanti et al. | ............. | 73/472 |

\* cited by examiner

*Primary Examiner*—Jayprakash N Gandhi
*Assistant Examiner*—Ingrid Wright
(74) *Attorney, Agent, or Firm*—McCarthy Law Group

(57) ABSTRACT

Isolation of an HDD production device such as a servo track writer from external vibration is provided. The isolated device and its nest or support are suspended in a fashion to allow one, two or three degrees of angular or rotational freedom of movement. The points of suspension are above the center of mass of the isolated device, alone or combined with its nest, and gravity will self-align the isolated device in the manner of an unforced pendulum. A relatively large moment of inertia for at least one direction of angular movement is provided, e.g., by positioning at least one suspension point spaced a relatively large distance from the center of mass to provide a large moment arm for such movement.

31 Claims, 4 Drawing Sheets

INERTIAL VIBRATION ISOLATION FOR HDD PRODUCTION

CROSS-REFERENCE TO RELATED APPLICATIONS

Priority is claimed from U.S. Provisional Application Ser. No. 60/722,851 filed Sep. 30, 2005, which is incorporated herein by reference.

FIELD OF THE INVENTION

The present invention is directed to isolation of vibration usable for e.g. isolating a servo track writer or other hard disk drive production device. In particular, the present invention is directed to a device configured to reduce or substantially eliminate rotational or arcuate components of vibrations.

BACKGROUND INFORMATION

Processes for manufacture or production of hard disk drives (HDDs) commonly involve writing, onto the surface of the disk or disks, marks or sectors which are used in properly positioning the HDD head during normal read/write use, typically using a tracking servo approach. These sectors or blocks are commonly called servo sectors or servo blocks. In many common HDD production facilities, the servo sectors or blocks are written onto the surfaces of the HDD disks using a device, which is configured especially for this purpose, called a servo track writer (STW). In general, it is desirable to provide a high degree of accuracy in the placement of the servo tracks, sectors or blocks. Accuracy of placement has become more important as disk capacity has improved by increasing data density.

One of the potential sources of inaccuracies is vibration, which may be transmitted to the servo track writer and/or any HDD coupled thereto. The vibrations can have any of a number of origins including vibrations in the building where the STW equipment is placed. Vibrations in the building can arise, e.g., from other equipment in the building, human walking or other movement, environmental sources such as wind, seismic vibrations and the like. Various approaches have been used in an attempt to isolate the STW (and/or in the HDD which is coupled thereto) from such vibrations. However, it is believed that there is room for improvement in STW vibration isolation techniques and/or apparatuses. Accordingly, it would be useful to provide apparatuses, methods and systems which can improve STW vibration isolation, e.g., by reducing or eliminating transmission of vibrations to the STW.

In a typical HDD production facility, there are costs associated with the space occupied by various production equipment. Such costs can be especially of concern in connection with servo track writer equipment or other equipment which is typically located in a clean room having relatively high costs, per square foot, of design, configuration, maintenance, etc. Accordingly, it would be useful to provide a system, method and apparatus for vibration isolation which has a relatively small average footprint and/or occupies a relatively small volume.

In some approaches, multiple servo track writers are mounted on a heavy mass such as a granite block, typically weighing hundreds of pounds. This approach has a relatively high capital cost, typically requires large amount of floor space, as well as specially-designed floors and stands, is difficult to change, expand or move and is difficult to handle in transport. Accordingly, it would be useful to provide an isolation device which is space-effective, relatively inexpensive, and relatively easy to accommodate, design, change and/or move.

In some approaches, STWs are mounted on active vibration isolation devices which sense oscillations or other motions and provide actuators, such as motors, pneumatic devices and the like, to cancel the motion (e.g. by applying, to the external vibration source, an opposite or out-of-phase motion). Such devices, unfortunately, have a relatively high capital cost and typically occupy a relatively large floor space. Any disturbance that occurs is typically easily transferred to all of the STWs in the system and the system tends to be prone to rocking motion in response to external disturbance. Further, pneumatic active damping typically requires special pneumatic supply arrangements. Accordingly, it would be useful to provide STW vibration isolation which has a relatively low capital cost, occupies small space, has a resistance to rocking or other disturbance in response to external forces and can be implemented without providing special supply arrangements.

In some approaches, STWs are mounted on platforms that are positioned on passive elastomer dampers. While this approach is relatively low cost, it is not especially effective at isolating vibrations, is especially susceptible to ground vibrations, and typically occupies a large floor space.

At least some previous vibration damping devices, such as spring-based dampers, are configured to provide the desired vibration dampening for a particular mass and may be relatively sensitive to changes in the weight or mass of the vibration-isolated device or region. In particular, isolation spring devices, in order to be effective, typically require the servo track writer nest or support to be very light in order to be effective. In general, using only linear or spring isolators, a heavier isolated mass requires stiffer springs, effectively reducing the damping and isolation of the spring-mass system. As a result, with such devices, it can be necessary to undergo (typically expensive and time-consuming) redesign of the isolation (damping) device in order to accommodate a new or modified design of an STW (or other vibration-damped device). Further, isolation springs can be relatively ineffective in blocking high-frequency vibration components. Accordingly, it would be useful to provide a vibration isolation apparatus, system and method which blocks high frequency vibrations, and which is relatively insensitive to changes in weight of the vibration-isolated device, preferably in a manner to provide substantially consistent characteristics for predictable damping and isolation.

Many previous spring-mass devices have a relatively large number of moving parts and/or require substantial maintenance for desired operation. Accordingly, it would be useful to provide a vibration isolation device which has relatively few moving parts and/or has a reduced need (compared to, e.g., spring-mass devices) for maintenance, preferably, in a manner such that the static or neutral position for the isolated device is achieved with little or no need for adjustment, such that the device is preferably substantially self-aligning.

SUMMARY OF THE INVENTION

The present invention includes a recognition and/or appreciation of the existence, nature and/or source of problems in the previous approaches, including those described herein. According to one embodiment of the invention, an isolation device is configured to damp or isolate vibrations which occur (or are substantially constrained to occur) along an arcuate path, or a combination of two or more substantially arcuate paths. According to one embodiment, a design is provided which increases the moment of inertia artificially (i.e., to a degree greater than that which is required by, and/or is normal for previous STW vibration isolation approaches). In one embodiment, the isolation devices are configured such that at least one such arcuate path has a relatively large radius, providing effective (rotational or angular) inertial damping (at least partially) by virtue of a relatively long moment arm for the arcuate motion.

According to one embodiment of the invention, one or more effective suspension points of the isolated mass is above the center of mass of the isolated device. In this way, the isolated device can substantially self-align, under the force of gravity, substantially as an (undriven) pendulum.

In one embodiment, isolation of an HDD production device such as a servo track writer from external vibration is provided. The isolated device and its nest or support are suspended in a fashion to allow one, two or three degrees of angular or rotational freedom of movement. The points of suspension are above the center of mass of the isolated device, alone or combined with its nest, and gravity will self-align the isolated device in the manner of an unforced pendulum. A relatively large moment of inertia for at least one direction of angular movement is provided, e.g., by positioning at least one suspension point spaced a relatively large distance from the center of mass to provide a large moment arm for such movement.

DETAILED DESCRIPTION

Figure 1:
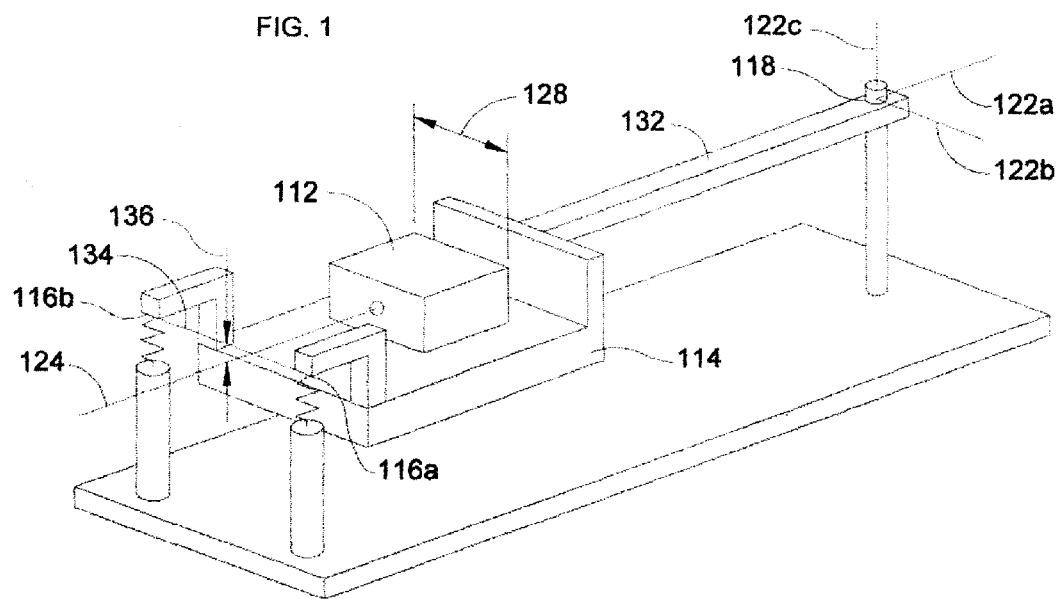
FIG. 1 is a simplified, generally schematic, perspective view of a vibration isolation device according to an embodiment of the present invention.
Figure 2:
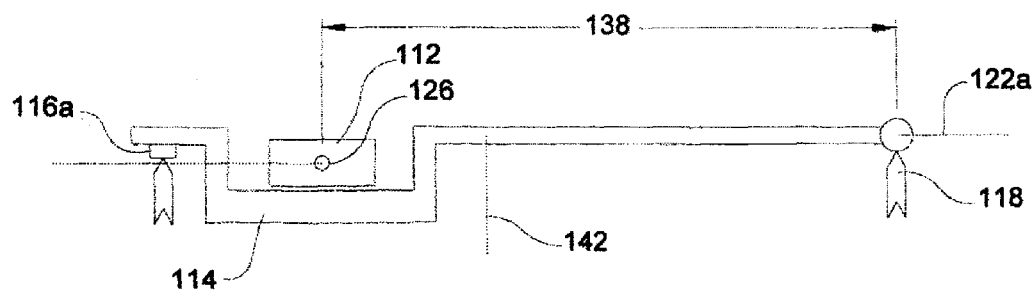
FIG. 2 is a simplified side elevational view of a vibration isolation device according to an embodiment of the present invention.
Figure 3:
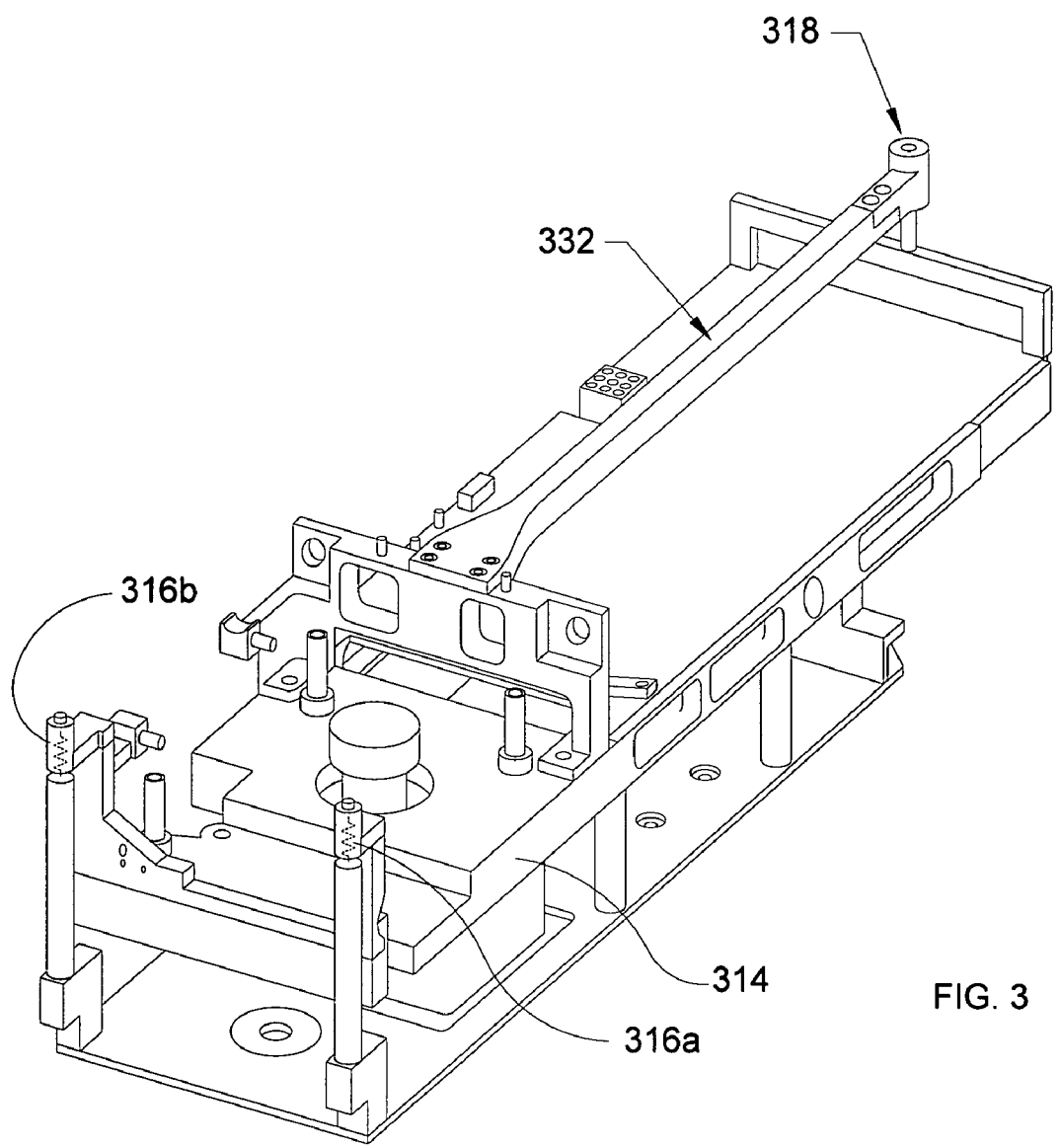
FIG. 3 is a simplified perspective view of a vibration isolation device according to an embodiment of the present invention.

As depicted in FIGS. 1 and 2, according to one embodiment, the isolated device 112 is supported in a nest structure or holder 114 suspended by supports 116A, B, 118. In the depicted embodiment, the support allows three degrees of (damped or limited) freedom of (angular) movement, such as roll movement about a longitudinal horizontal axis 122A, pitch movement about a transverse horizontal axis 122B and yaw movement about a vertical axis 122C. Although in an actual device, the potential movement or oscillation may be relatively complex, and although the axes about which rotational movements occur may differ from the placement depicted in FIG. 1, the potential movement of the device 112 can, in general, be described by a combination of a plurality of roll, pitch and yaw oscillations of various frequencies, in a manner understood by those skilled in the art.

Although potential movement of the isolated device can be considered as a combination of angular movements or oscillations, in the depicted embodiment, the rear support 118 provides angular damping of movement (e.g., about vertical axis 122C) while the forward supports 116A, B provide damping substantially of linear movement (substantially along their respective longitudinal axes). In one embodiment, the forward supports 116A, B comprise anti-vibration elastomer mounts which tend to bulge a small amount in response to the load applied to the elastomer. Other possible configurations for the forward mounts 116A, B include springs, pneumatic or hydraulic dampening supports and the like.

In one embodiment, the rear support 118 is configured to behave generally as a damped rotational joint such as by providing a cylindrical elastomer mount constrained (e.g., in a sleeve structure) against the normal bulging and permitting an amount of twisting or torsional motion. Other devices, e.g., for providing the rear suspension 118 can be used including, e.g., a swivel-flexible coupling.

As depicted in FIGS. 1 and 2, at least one of the supports (e.g., the rear support in the illustrated embodiment) is a relatively long distance 124 from the center of gravity 126 of the isolated device 112, providing a relatively long moment arm for any rotational or angular movement about the rear support 118. In one embodiment, the length of the moment arm 124 is at least twice the width 128 of the isolated device 112 (or, for an irregularly shaped isolated device, at least twice the largest longitudinal or transverse horizontal dimension of the isolated device), preferably at least three times the width or largest horizontal dimension and even more preferably four or more times the width or largest horizontal dimension of the isolated device.

In general, when the isolated device is configured with freedom of rotation or angular movement, resistance to movement, or rotational inertia, is related to the magnitude of the moment arm of the rotational movement, and resistance to movement can be increased by providing a longer moment arm. In actual devices, the relationship is more complex and not entirely determinant. For example, the relationship of moment arm to dampening of an oscillatory rotational movement will have a complicated relationship relating to items such as the frequency power spectrum of the oscillation, the location of the effective rotational axes, the (typically three dimensional) dampening response of the various supports, natural resonance frequencies and other characteristics of the support arm 132, nest 114 and the like.

Despite the complicated nature of the relationship, it has been found that useful vibration isolation can be achieved at desired frequency or frequency ranges and that it is possible to (e.g., empirically or theoretically) select a moment arm length 124 to achieve particular vibration isolation goals.

In some applications, the isolated device 112 includes a servo track writer (STW) and an attached hard disk drive which is undergoing a track writing procedure. Such isolated devices (including such components as latches, electrical or pneumatic power or control lines and the like) have a center of gravity. More precisely, the effective center of gravity from the point of view of one of the supports, will include the effective mass distribution of the nest, arm and the like. In general, the center of mass will be that point in space which has the characteristic that if all of the mass of the isolated device and related significant structures (e.g., the nest, arm, latches, etc.) were concentrated at this single point (with supports and structural connections otherwise being kept unchanged), the behavior of the system would be substantially identical.

As shown in FIG. 1, the line 134 passing through the support points of the forward supports 116A, B is located a distance 136 above a horizontal line 138 passing through the effective center of mass 126 of the isolated device(s). Preferably, the effective center of mass 126 is below the three support points of supports 116A, B, 118, e.g., in the sense that a plane defined by the three support points intersects a vertical line which passes through the center of mass 126 at a point which is vertically above the center of mass 126. With these support points being located higher than the effective center of mass 126, the isolated device and nest assembly is suspended, such that the force of gravity will tend to bring the assembly to rest so as to position the center mass 126 at the lowest possible point, in the fashion of a non-driven pendulum. This provides a configuration in which the STW-nest assembly is substantially self-aligning.

A number of variations and modifications of the invention can be used. Although procedures for designing, implementing and/or using vibration isolation according to the present invention have been described, it is possible to use other procedures including procedures having more or fewer steps, or in which steps are performed in an order different from that described.

Although embodiments have been described in which the STW nest or support is suspended at three points, it is possible to devise embodiments using four or more suspension points or less than three suspension points. For example, by suspending a (preferably, longitudinally symmetrical) device on two (front and rear) socket cups or other suspension devices, a swing-type motion (preferably self-aligning) can be provided with angular damping. In one configuration, rather than providing a substantially pivoting rear support, the moment of inertia approach could involve attaching a heavy mass to an (extended) free end of the rear cradle arm.

Although the present invention provides a number of advantages over previous approaches, including those described herein, it is possible, if desired, to combine vibration isolation as described with one or more previous vibration isolation approaches including, e.g., active damping, inertial mass, or other approaches.

Although embodiments have been described in which the isolated device is an STW and coupled HDD, it is possible to use some or all features of the present invention in connection with providing vibration isolation in other contexts. For example, vibration isolation can be used in HDD field procedures, test procedures, drive characterization procedures and the like. Vibration isolation can be used in connection with chip fabrication, optical device fabrication or mounting and the like. According to one approach, inertia is increased using an increase in moment of inertia by attaching a weighted symmetrical wing-like (laterally extending) structure. Although the present invention has been described in connection with reducing vibration in connection with a servo track writer, other industries or processes can use some or all aspects of the present invention, including photolithography or other processes in the semiconductor industry, and/or the automotive industry. Features of the invention are generally useful whenever it may be desired to isolate and dampen externally induced vibration from being transferred to vibration-sensitive equipment and applications.

Although embodiments have been described in which some supports (e.g., 116A, B) are closer to the isolated device 112 than others (e.g., support 118 which is separated by the inertial arm 132), it is possible to provide devices in which there are two or more relatively long moment arms between the isolated device and suspension devices.

Figure 4:
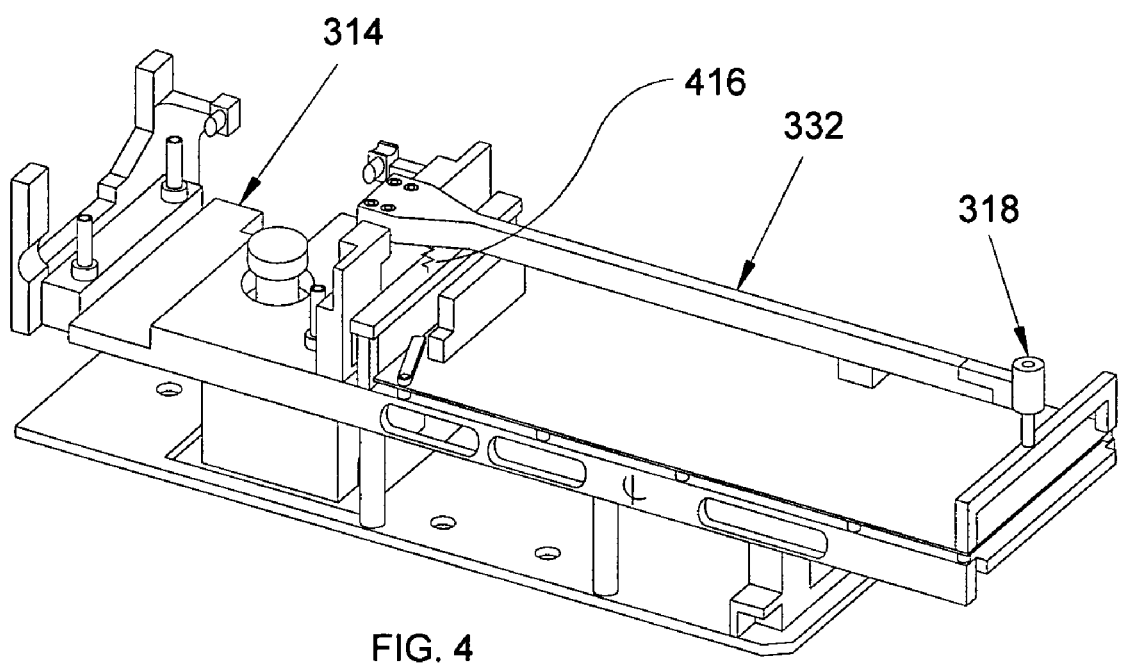
FIG. 4 is a simplified perspective view of a vibration isolation device according to an embodiment of the present invention; and, FIG. 5 is a simplified perspective view of a vibration isolation device according to an embodiment of the present invention.
Figure 5:
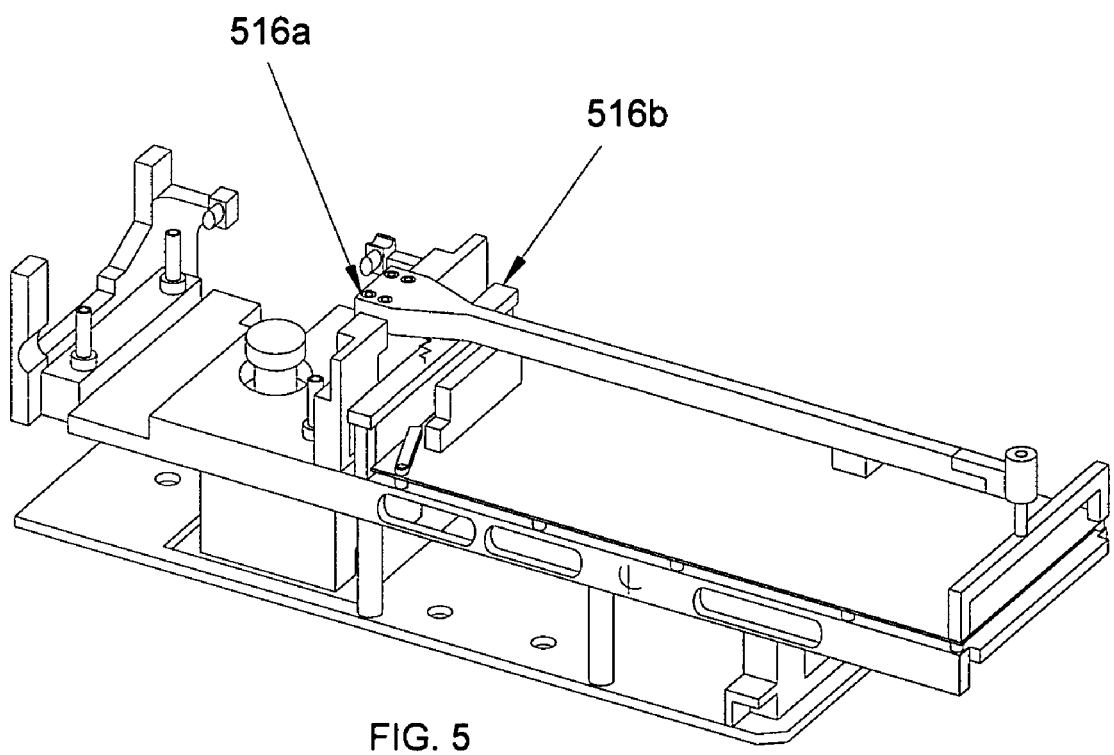

Although embodiments have been described in which the isolated device 112 is positioned substantially between forward suspension devices 116A, B and rear suspension device 118, it is possible to provide configurations in which two or more, or in which all, suspension devices are on one side of the isolated device (e.g., by positioning a suspension device, e.g., substantially along axis 142 of FIG. 2). In the embodiment depicted in FIG. 4, rather than two forward supports, a single support spring 416 is provided in a central position. The embodiment depicted in FIG. 5 is similar to that depicted in FIG. 4. However, in the embodiment of FIG. 5, there are two spring suspension devices 516A and 516B, rather than the single spring support depicted in FIG. 4.

In light of the above description, a number of advantages of the present invention can be seen. The present invention can isolate and/or dampen externally-induced vibrations within a small form factor. The present invention can accommodate a number of STW designs, particularly since, using embodiments of the present invention, the weight of the nest is not critical. Indeed, increases in mass of the nest and/or isolated device are expected to provide improvements in isolation from vibrations. The present invention can provide for consistent characteristics, leading to predictability of the damping and isolation effects. The present invention can provide a device which is substantially self-aligning. The present invention can be provided with fewer moving components and lower maintenance costs compared to at least some previous approaches. The present invention can be provided in forms which are effective in blocking high-frequency components of external vibration. The present invention can be provided in a form which is relatively low in initial equipment, capital cost, compared to at least some previous approaches. The present invention can be provided in forms which are relatively easy to expand, change, move, handle and/or transport, compared to at least some previous approaches. The present invention can provide at least partial resistance to rocking in response to external disturbance. The present invention can be provided in forms which are not particularly prone to transferring disturbance from one STW to another.

The present invention, in various embodiments, includes components, methods, processes, systems and/or apparatuses substantially similar to those depicted and described herein, including various embodiments, sub-combinations, and subsets thereof. Those skilled in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of isolating a first HDD production device from a source of vibration comprising:
   selecting a target maximum tolerable amount of vibration;
   providing a first holder which holds said first HDD production device, to provide an assembly of said first holder and said first HDD production device, said assembly having a center of mass;
   coupling said first holder to a first arm to provide an assembly/arm combination;
   suspending said assembly/arm combination using at least a first support, supporting said first arm at a first effective point of suspension;
   determining a first location of said first effective point of suspension such that a first moment arm, defined by a horizontal distance between vertical lines passing through said center of mass and said first effective point of suspension is sufficiently large to provide said target maximum tolerable amount of vibration; and
   positioning said first effective point of suspension at said first location.

2. The method as claimed in claim 1, wherein said first support provides for damped pivoting of said first arm about a substantially vertical axis.

3. The method as claimed in claim 2, wherein said first support is selected from among an elastomer support or a spring support or a swivel-flexible coupling.

4. The method as claimed in claim 1, further comprising providing at least a second support determining the location of a second effective point of suspension.

5. The method as claimed in claim 4, wherein said first and second effective points of suspension are each at heights greater than the center of mass of the assembly arm/combination.

6. The method as claimed in claim 1, wherein said first HDD production device is a servo track writer.

7. The method as claimed in claim 1, wherein said first HDD production device comprises a test rack.

8. The method as claimed in claim 1, wherein said target maximum tolerable amount of vibration is less than about ¼ the magnitude of said source of the vibration in the frequency range from about 0 to about 1.5 kilohertz.

9. An apparatus for isolating a first HDD production device from a source of vibration to provide a target maximum tolerable amount of vibration comprising:
   a first holder which holds said first HDD production device, to provide an assembly of said first holder and said first HDD production device, said assembly having a center of mass;
   a first arm coupled to said first holder to provide an assembly/arm combination;
   a first support, which supports said first arm at a first effective point of suspension,
   wherein said first support is positioned so as to locate said first effective point of suspension such that a first moment arm, defined by a horizontal distance between vertical lines passing through said center of mass and said first effective point of suspension, is sufficiently large to provide said target a maximum tolerable amount of vibration.

10. The apparatus as claimed in claim 9, wherein said first support is configured to provide damped pivoting of said first arm about a substantially vertical axis.

11. The apparatus as claimed in claim 9, wherein said first support is selected from among an elastomer support or a spring support or a swivel-flexible coupling.

12. The apparatus as claimed in claim 9, further comprising at least a second support which determines a location of a second effective point of suspension.

13. The apparatus as claimed in claim 12, wherein said first and second effective points of suspension are each at heights greater than the center of mass of the assembly.

14. The apparatus as claimed in claim 9, wherein said first HDD production device is a servo track writer.

15. The apparatus as claimed in claim 9, wherein said first HDD production device comprises a test rack.

16. The apparatus as claimed in claim 9, wherein said target maximum tolerable amount of vibration is less than about ¼ the magnitude of said source of the vibration in the frequency range from about 0 to about 1.5 kilohertz.

17. An apparatus for isolating a first HDD production device from a source of vibration to provide a target maximum tolerable amount of vibration comprising:
   means for holding said first HDD production device, to provide an assembly of said means for holding said first HDD production device, said assembly having a center of mass;
   a first arm coupled to said means for holding to provide an assembly/arm combination;
   first means for supporting said first arm at a first effective point of suspension,
   wherein said first means for supporting is positioned so as to locate said first effective point of suspension such that a first moment arm, defined by a horizontal distance between vertical lines passing through said center of mass and said first effective point of suspension, is sufficiently large to provide said target maximum tolerable amount of vibration.

18. The apparatus as claimed in claim 17, wherein said first means for supporting is configured to provide damped pivoting of said first arm about a substantially vertical axis.

19. The apparatus as claimed in claim 17, wherein said first means for supporting is selected from among an elastomer support or a spring support or a swivel-flexible coupling.

20. The apparatus as claimed in claim 19, further comprising at least a second means for supporting which determines the location of a second effective point of suspension.

21. The apparatus as claimed in claim 20, wherein said first and second effective points of suspension are each at heights greater than the center of mass of the assembly.

22. The apparatus as claimed in claim 17, wherein said target maximum tolerable amount of vibration is less than about ¼ the magnitude of said source of the vibration in the frequency range from about 0 to about 1.5 kilohertz.

23. An apparatus for isolating a device from vibration transmitted by a source of the vibration, the apparatus comprising:
   a base to which the vibration is operably transmitted from the source;
   a holder configured to operably support the device;
   a first support extending from the base and comprising a damping rotational joint suspending the holder to define a spatial separation between the holder and the base, isolating the holder from the vibration; and
   a second support extending from the base and comprising a damping joint suspending the holder to further define the spatial separation between the holder and the base, isolating the holder from the vibration.

24. The apparatus of claim 23 wherein the second support comprises a damping linear joint.

25. The apparatus of claim 23 wherein the first support comprises a longitudinally elongated arm connecting the damping rotational joint to the holder, a span of the elongated arm selected to attenuate vibration transmitted to the holder below a predetermined threshold level.

26. The apparatus of claim 25 wherein the first and second supports suspend the holder from respective first and second suspension points, and wherein a first longitudinal distance between a vertical axis through a center of mass of the device while operably supported by the holder and a vertical axis through the first suspension point is greater than a second longitudinal distance between the vertical axis through the center of mass of the device while operably supported by the holder and a vertical axis through the second suspension point.

27. The apparatus of claim 25 wherein the first and second supports suspend the holder from respective first and second suspension points, and wherein a first longitudinal distance between a vertical axis through a center of mass of the device while operably supported by the holder and a vertical axis through the first suspension point is greater than a maximum lateral width of the device.

28. The apparatus of claim 25 wherein the first and second supports suspend the holder from respective first and second suspension points, and wherein at least one of the first and second suspension points is disposed above a longitudinal axis passing through the center of mass of the device while operably supported by the holder.

29. The apparatus of claim 28 wherein the first and second suspension points are disposed above the longitudinal axis passing through the center of mass of the device while operably supported by the holder.

30. The apparatus of claim 23 wherein the device comprises a device that writes or certifies servo data in relation to a storage medium.

31. A method comprising:

obtaining a vibration isolating apparatus having a base, a holder, a first support extending from the base and comprising a damping rotational joint suspending the holder to define a spatial separation between the holder and the base, isolating the holder from vibration transmitted from a source to the base, and a second support extending from the base and comprising a damping joint suspending the holder to further define the spatial separation between the holder and the base, isolating the holder from the vibration;

placing a device on the holder that is configured to operate below a threshold vibration level that is less than the vibration transmitted from the source to the base; and after the placing step, operating the device below the threshold vibration level.

* * * * *